(12) United States Patent
Mukherjee et al.

(10) Patent No.: US 10,925,053 B2
(45) Date of Patent: Feb. 16, 2021

(54) FIRST COMMUNICATION DEVICE, SECOND COMMUNICATION DEVICE AND METHODS THEREIN, FOR SENDING AND RECEIVING, RESPECTIVELY, AN INDICATION OF A SUBFRAME TYPE

(71) Applicant: Telefonaktiebolaget L M Ericsson (publ), Stockholm (SE)

(72) Inventors: Amitav Mukherjee, Santa Clara, CA (US); Jung-Fu Cheng, Fremont, CA (US); Havish Koorapaty, Saratoga, CA (US); Daniel Larsson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 318 days.

(21) Appl. No.: 14/778,919

(22) PCT Filed: May 19, 2015

(86) PCT No.: PCT/SE2015/050558
§ 371 (c)(1),
(2) Date: Sep. 21, 2015

(87) PCT Pub. No.: WO2016/048212
PCT Pub. Date: Mar. 31, 2016

(65) Prior Publication Data
US 2016/0309464 A1 Oct. 20, 2016

Related U.S. Application Data

(60) Provisional application No. 62/055,747, filed on Sep. 26, 2014.

(51) Int. Cl.
*H04W 72/04* (2009.01)
*H04W 72/12* (2009.01)
(Continued)

(52) U.S. Cl.
CPC ....... *H04W 72/0446* (2013.01); *H04W 28/06* (2013.01); *H04W 72/1278* (2013.01); *H04W 84/12* (2013.01); *H04W 88/02* (2013.01)

(58) Field of Classification Search
CPC . H04W 84/12; H04W 72/0446; H04W 88/02; H04W 72/1278; H04W 28/06
See application file for complete search history.

(56) References Cited

U.S. PATENT DOCUMENTS

2009/0067448 A1* 3/2009 Stanwood ............ H04L 12/413
370/447
2009/0080386 A1 3/2009 Yavus et al.
(Continued)

FOREIGN PATENT DOCUMENTS

GB 2506152 A 3/2014
WO 2013/087835 A1 6/2013
(Continued)

OTHER PUBLICATIONS

International Search Report and Written Opinion dated Sep. 7, 2015 for International Application No. PCT/SE2015/050558, International Filing Date May 19, 2015, consisting of 9 pages.
(Continued)

*Primary Examiner* — Un C Cho
*Assistant Examiner* — Peter K Mak
(74) *Attorney, Agent, or Firm* — Christopher & Weisberg, P.A.

(57) ABSTRACT

A method performed by a first communication device is described herein for sending an indication to a second communication device. The first communication device determines an indication of a subframe type. The subframe type is of a subframe sent on a carrier by a cell associated with the first communication device and a second communication device. The subframe type is one of punctured and
(Continued)

normal. The first communication device sends the indication to the second communication device, the indication being as determined by the first communication device.

19 Claims, 11 Drawing Sheets

(51) Int. Cl.
*H04W 84/12* (2009.01)
*H04W 28/06* (2009.01)
*H04W 88/02* (2009.01)

(56) References Cited

U.S. PATENT DOCUMENTS

| | | | |
|---|---|---|---|
| 2009/0109914 A1* | 4/2009 | McBeath | H04W 72/042 370/329 |
| 2012/0127898 A1* | 5/2012 | Lim | H04L 5/0044 370/281 |
| 2013/0039193 A1* | 2/2013 | Yin | H04W 72/0486 370/252 |
| 2013/0107705 A1 | 5/2013 | Dinan | |
| 2013/0194956 A1* | 8/2013 | Sartori | H04W 24/02 370/252 |
| 2013/0201975 A1* | 8/2013 | Chen | H04W 72/0446 370/336 |
| 2015/0103715 A1* | 4/2015 | Chen | H04L 69/14 370/311 |
| 2015/0215874 A1* | 7/2015 | Chen | H04W 52/18 455/522 |
| 2015/0223075 A1* | 8/2015 | Bashar | H04W 16/14 370/329 |
| 2015/0230211 A1* | 8/2015 | You | H04L 5/0051 370/330 |
| 2015/0245376 A1* | 8/2015 | Bashar | H04L 1/18 370/277 |
| 2017/0195888 A1* | 7/2017 | Gou | H04W 16/14 |

FOREIGN PATENT DOCUMENTS

| | | |
|---|---|---|
| WO | 2013/131267 A1 | 9/2013 |
| WO | 2014/137525 A1 | 9/2014 |

OTHER PUBLICATIONS

Russian Office Action and English translation thereof dated Apr. 23, 2018 and issued in corresponding Russian Patent Application No. 2017114194/08, consisting of 10 pages.

Extended European Search Report dated Apr. 10, 2019 and issued in corresponding European Patent Application No. 18248097.0, consisting of 8 pages.

Indian Office Action dated Oct. 22, 2019 and issued in corresponding Indian Patent Application No. 201737010518, consisting of 7 pages.

Chinese Office Action and English language summary thereof dated May 25, 2020 issued in corresponding Chinese Patent Application No. 201580064537.7, consisting of 11 pages.

Brazilian Preliminary Office Action and English language machine translation of the Brazilian Office Action dated Sep. 24, 2020 issued in corresponding Brazilian Patent Application No. BR112017005951-7, consisting of 9 pages.

* cited by examiner

FIRST COMMUNICATION DEVICE, SECOND COMMUNICATION DEVICE AND METHODS THEREIN, FOR SENDING AND RECEIVING, RESPECTIVELY, AN INDICATION OF A SUBFRAME TYPE

TECHNICAL FIELD

Embodiments herein relate to a first communication device and a second communication device and methods therein for sending and receiving, respectively, an indication. Embodiments herein further relate to computer programs and computer-readable storage mediums, having stored thereon the computer programs to carry out these methods.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. evolved NodeB "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The new 3GPP Release 13 study item "Licensed-Assisted Access" (LAA) intends to allow LTE equipment to also operate in the unlicensed 5 Gigahertz (GHz) radio spectrum. The unlicensed 5 GHz spectrum may be used as a complement to the licensed spectrum. Accordingly, communication devices connect in the licensed spectrum, through e.g., a primary cell or PCell, and may use carrier aggregation to benefit from additional transmission capacity in the unlicensed spectrum, through e.g., a secondary cell or SCell. To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum may be shared with other radios of similar or dissimilar wireless technologies, a so called Listen-Before-Talk (LBT) method needs to be applied. Today, the unlicensed 5 GHz spectrum is mainly used by equipment implementing the IEEE 802.11 Wireless Local Area Network (WLAN) standard. This standard is known under its marketing brand "Wi-Fi."

The LBT procedure involves sensing the medium for a pre-defined minimum amount of time, and backing off if the channel is busy. In a frame-based system such as LTE, during LBT, a fraction of the Orthogonal Frequency-Division Multiplexing (OFDM) symbols in a DL or UL subframe may need to be silenced or punctured. Thus, at least two types of subframes are present in a LAA system, normal subframes and new punctured subframes. A punctured subframe may be understood as a subframe in which one or more OFDM symbols do not contain control message or data signals for a communication device such as a UE. Such one or more OFDM symbols may carry no transmitted signal or may carry signals not containing control message or data for the communication device. A normal subframe may be understood as a subframe that is not punctured. The time-frequency location of reference signals, control channels, and data channels may be different in a punctured subframe compared to a normal subframe.

LTE

LTE uses OFDM in the DL and Discrete Fourier Transform (DFT)-spread OFDM, also referred to as Single-Carrier Frequency Division Multiple-Access (SC-FDMA), in the UL. The basic LTE DL physical resource may thus be seen as a time-frequency grid as illustrated in FIG. 1, where each resource element corresponds to one OFDM subcarrier during one OFDM symbol interval. The UL subframe may have the same subcarrier spacing as the DL, and the same number of SC-FDMA symbols in the time domain as OFDM symbols in the DL. The subcarrier spacing has been chosen to be 15 kiloHertz (kHz), as shown.

In the time domain, LTE DL transmissions are organized into radio frames of 10 milliseconds (ms), each radio frame consisting of ten equally-sized subframes of length Tsubframe=1 ms as shown in FIG. 2, which illustrates the LTE time-domain structure. For normal cyclic prefix, one subframe may consist of 14 OFDM symbols. The duration of each symbol is approximately 71.4 microseconds (μs).

Furthermore, the resource allocation in LTE is typically described in terms of resource blocks, where a resource block corresponds to one slot, 0.5 ms, in the time domain and 12 contiguous subcarriers in the frequency domain. A pair of two adjacent resource blocks in the time direction, 1.0 ms, is known as a resource block pair. Resource blocks are numbered in the frequency domain, starting with 0 from one end of the system bandwidth.

Downlink transmissions may be dynamically scheduled, i.e., in each subframe the base station may transmit control information about which terminals data is transmitted to, and upon which resource blocks the data is transmitted, in the current DL subframe. This control signaling may be typically transmitted in the first 1, 2, 3 or 4 OFDM symbols in each subframe, and the number n=1, 2, 3 or 4 is known as the Control Format Indicator (CFI). The DL subframe may also contain common reference symbols, which may be known to the receiver, and used for coherent demodulation of e.g., the control information. A DL system with CFI=3 OFDM symbols as control region is illustrated in FIG. 3, which illustrates a normal DL subframe. The control region in FIG. 3 is shown as comprising control signaling, indicated by black squares, reference symbols, indicated by striped squares, and unused symbols, indicated by checkered squares.

From 3GPP LTE LTE Release 11 onwards, the above described resource assignments may also be scheduled on the enhanced Physical Downlink Control Channel (EPDCCH). For Release 8 to Release 10, only Physical Downlink Control Channel (PDCCH) is available.

The reference symbols shown in the above FIG. 3 are the Cell-specific Reference Symbols (CRS) and they may be used to support multiple functions including fine time and frequency synchronization and channel estimation for certain transmission modes.

Physical Downlink Control Channel (PDCCH) and Enhanced PDCCH (EPDCCH)

The PDCCH and/or EPDCCH may be used to carry DL Control Information (DCI) such as scheduling decisions and power-control commands. More specifically, the DCI may include:

Downlink scheduling assignments, including Physical DL Shared CHannel (PDSCH) resource indication, transport format, hybrid-Automatic Repeat reQuest (ARQ) information, and control information related to spatial multiplexing, if applicable. A DL scheduling assignment may also include a command for power control of the Physical Uplink Control CHannel (PUCCH) used for transmission of hybrid-ARQ acknowledgements in response to DL scheduling assignments.

Uplink scheduling grants, including Physical UL Shared CHannel (PUSCH) resource indication, transport format, and hybrid-ARQ-related information. An UL scheduling grant may also include a command for power control of the PUSCH.

Power-control commands for a set of terminals as a complement to the commands included in the scheduling assignments/grants.

One PDCCH and/or EPDCCH may carry one DCI message containing one of the groups of information listed above. As multiple terminals may be scheduled simultaneously, and each terminal may be scheduled on both DL and UL simultaneously, there may be a possibility to transmit multiple scheduling messages within each subframe. Each scheduling message may be transmitted on separate PDCCH and/or EPDCCH resources, and consequently, there may be typically multiple simultaneous PDCCH and/or EPDCCH transmissions within each subframe in each cell. Furthermore, to support different radio-channel conditions, link adaptation may be used, where the code rate of the PDCCH and/or EPDCCH is selected by adapting the resource usage for the PDCCH and/or EPDCCH, to match the radio-channel conditions.

Carrier Aggregation

The LTE Release 10 standard supports bandwidths larger than 20 MegaHertz (MHz). One important requirement on LTE Release 10 may be to assure backward compatibility with LTE Release 8. This may also include spectrum compatibility. That may imply that an LTE Release 10 carrier, wider than 20 MHz, may appear as a number of LTE carriers to an LTE Release 8 terminal. Each such carrier may be referred to as a Component Carrier (CC). In particular, for early LTE Release 10 deployments, it may be expected that there may be a smaller number of LTE Release 10-capable terminals compared to many LTE legacy terminals. Therefore, it may be necessary to assure an efficient use of a wide carrier also for legacy terminals, i.e., that it is possible to implement carriers where legacy terminals may be scheduled in all parts of the wideband LTE Release 10 carrier. The straightforward way to obtain this may be by means of Carrier Aggregation (CA). CA implies that an LTE Release 10 terminal may receive multiple CC, where the CC may have, or at least the possibility to have, the same structure as a Release 8 carrier. CA is illustrated in FIG. 4, where 5 carriers of 20 MHz each are aggregated to form a bandwidth of 100 MHz. A CA-capable communication device, such as a UE, may be assigned a Primary Cell (PCell) which is always activated, and one or more Secondary Cells (SCells), which may be activated or deactivated dynamically.

The number of aggregated CC as well as the bandwidth of the individual CC may be different for UL and DL. A symmetric configuration refers to the case where the number of CCs in DL and UL is the same, whereas an asymmetric configuration refers to the case that the number of CCs is different. It is important to note that the number of CCs configured in a cell may be different from the number of CCs seen by a terminal: A terminal may for example support more DL CCs UL CCs, even though the cell is configured with the same number of UL and DL CCs.

In addition, a feature of CA may be the ability to perform cross-carrier scheduling. This mechanism may allow a (E)PDCCH on one CC to schedule data transmissions on another CC by means of a 3-bit Carrier Indicator Field (CIF) inserted at the beginning of the (E)PDCCH messages. For data transmissions on a given CC, a UE may expect to receive scheduling messages on the (E)PDCCH on just one CC—either the same CC, or a different CC via cross-carrier scheduling; this mapping from (E)PDCCH to PDSCH may also be configured semi-statically.

Wireless Local Area Network (WLAN)

In typical deployments of WLAN, Carrier Sense Multiple Access with Collision Avoidance (CSMA/CA) may be used for medium access. This means that the channel may be sensed to perform a Clear Channel Assessment (CCA), and a transmission may be initiated only if the channel is declared as Idle. In case the channel is declared as Busy, the transmission may be essentially deferred until the channel is deemed to be Idle. When the range of several Access Points (APs) using the same frequency overlap, this means that all transmissions related to one AP may be deferred in case a transmission on the same frequency to or from another AP, which is within range, may be detected. Effectively, this means that if several APs are within range, they may have to share the channel in time, and the throughput for the individual APs may be severely degraded. A general illustration on an example of the Listen Before Talk (LBT) mechanism or process is shown in FIG. 5. The frame based LBT framework may allow an equipment to perform a CCA per fixed frame period for a duration of T1, as illustrated in FIG. 5 by a circled 1. CCA may be performed using Energy detection. If the channel is found to be available after the CCA operation, as indicated by a check sign in the Figure, the equipment may transmit immediately up to 10 ms where this time is referred to as the channel occupancy time, and denoted by T2 and a circled 2 in FIG. 5. During T2, data may be transmitted and control signals may be sent without a CCA check during the period denoted by a circled 5. After this, the equipment remains silent for at least 5% of said channel occupancy time, shown as T3 and a circled 3 in FIG. 5, and known as the idle period. At the end of the required idle period, the equipment may resume CCA for channel access. If the channel is found to be busy after the CCA operation, as indicated by a cross sign, the equipment defers the fixed frame period, denoted by T4 and a circled 4 in FIG. 5, and does not transmit during this fixed frame period. The equipment may then start CCA at the end of the prohibited time.

Licensed-Assisted Access (LAA) to Unlicensed Spectrum Using LTE

Up to now, the spectrum used by LTE may be dedicated to LTE. This may have the advantage that the LTE system may not need to care about the coexistence issue and the spectrum efficiency may be maximized. However, the spectrum allocated to LTE is limited, which may not meet the ever increasing demand for larger throughput from applications and/or services. Therefore, a new study item has been initiated in 3GPP on extending LTE to exploit unlicensed spectrum in addition to licensed spectrum. Unlicensed spectrum may, by definition, be simultaneously used by multiple different technologies. Therefore, LTE may need to consider the coexistence issue with other systems such as IEEE 802.11 (Wi-Fi). Operating LTE in the same manner in unlicensed spectrum as in licensed spectrum may seriously degrade the performance of Wi-Fi, as Wi-Fi cannot transmit once it detects the channel is occupied.

Furthermore, one way to utilize the unlicensed spectrum reliably may be to transmit essential control signals and channels on a licensed carrier. That is, as shown in FIG. 6, a UE may be connected to a PCell in the licensed band and one or more SCells in the unlicensed band. Herein, a SCell in unlicensed spectrum is referred to as a Licensed-Assisted Access Secondary Cell (LAA SCell) or Licensed-Assisted Access Cell. FIG. 6 illustrates LAA to unlicensed spectrum using LTE carrier aggregation.

Existing LTE communication methods do not adequately consider the coexistence of LTE with other technologies, which may result in degraded communications in a shared environment. For instance, an existing LTE carrier may transmit at least the CRS persistently even when the LTE carrier is not transmitting data to any UEs. This persistent CRS transmission may cause interference to or prevent channel access from other technologies an represent an unnecessary wastage of resources.

SUMMARY

It is an object of embodiments herein to improve the performance in a wireless communications network by improving the coexistence of different radio access technologies.

According to a first aspect of embodiments herein, the object is achieved by a method performed by a first communication device. The method is for sending an indication to a second communication device. The first communication device determines an indication of a subframe type. The subframe type is of a subframe sent on a carrier by a cell associated with the first communication device and a second communication device. The subframe type is one of punctured and normal. The first communication device also sends the indication to the second communication device, the indication being as determined by the first communication device.

According to a second aspect of embodiments herein, the object is achieved by a method performed by the second communication device. The method is for receiving the indication from the first communication device. The second communication device receives, from the first communication device, the indication of the subframe type. The subframe type is of the subframe received from the first communication device on the carrier by the cell associated with the first communication device and the second communication device. The subframe type is one of punctured and normal. The second communication device also maps the information comprised in the subframe received from the first communication device, according to the received indication.

According to a third aspect of embodiments herein, the object is achieved by the first communication device. The first communication device is configured to determine the indication of the subframe type. The subframe type is of the subframe sent on the carrier by the cell associated with the first communication device and the second communication device. The subframe type is one of punctured and normal. The first communication device is also configured to send the indication to the second communication device, the indication being as configured to be determined by the first communication device.

According to a fourth aspect of embodiments herein, the object is achieved by the second communication device configured to receive the indication from the first communication device. The second communication device is further configured to: receive from the first communication device the indication of the subframe type. The subframe type is of the subframe configured to be received from the first communication device on the carrier by the cell associated with the first communication device and the second communication device. The subframe type is one of punctured and normal. The second communication device is further configured to: map information comprised in the subframe configured to be received from the first communication device, according to the received indication.

According to a fifth aspect of embodiments herein, the object is achieved by a computer program, comprising instructions which, when executed on at least one processor, cause the at least one processor to carry out the method performed by the first communication device.

According to a sixth aspect of embodiments herein, the object is achieved by a computer-readable storage medium, having stored thereon a computer program, comprising instructions which, when executed on at least one processor, cause the at least one processor to carry out the method performed by the first communication device.

According to a seventh aspect of embodiments herein, the object is achieved by a computer program, comprising instructions which, when executed on at least one processor, cause the at least one processor to carry out the method performed by the second communication device.

According to an eighth aspect of embodiments herein, the object is achieved by a computer-readable storage medium, having stored thereon a computer program, comprising instructions which, when executed on at least one processor, cause the at least one processor to carry out the method performed by the second communication device.

By the first communication device determining and then sending to the second communication device the indication of the subframe type, the first communication device enables the second communication device to map information comprised in the subframe sent, according to the received indication. For example, if the second communication device is a UE, it may determine the RE mapping of reference signals, control channels, and data channels for a particular DL subframe. If the second communication device is an eNB, the indication allows the eNB to determine the RE mapping of reference signals, control channels and data channels for a particular UL subframe. By the subframe type being one of punctured and normal, the coexistence of different radio access technologies, such as LTE and Wi-Fi may be improved in processes such as LBT. During LBT, certain subframes may be punctured. Thus, a communication device receiving the subframe along with the indication may determine the location of the information comprised in the subframe according to the indication of subframe type received.

BRIEF DESCRIPTION OF THE DRAWINGS

Examples of embodiments herein are described in more detail with reference to the accompanying drawings, in which.

DETAILED DESCRIPTION

Figure 1:
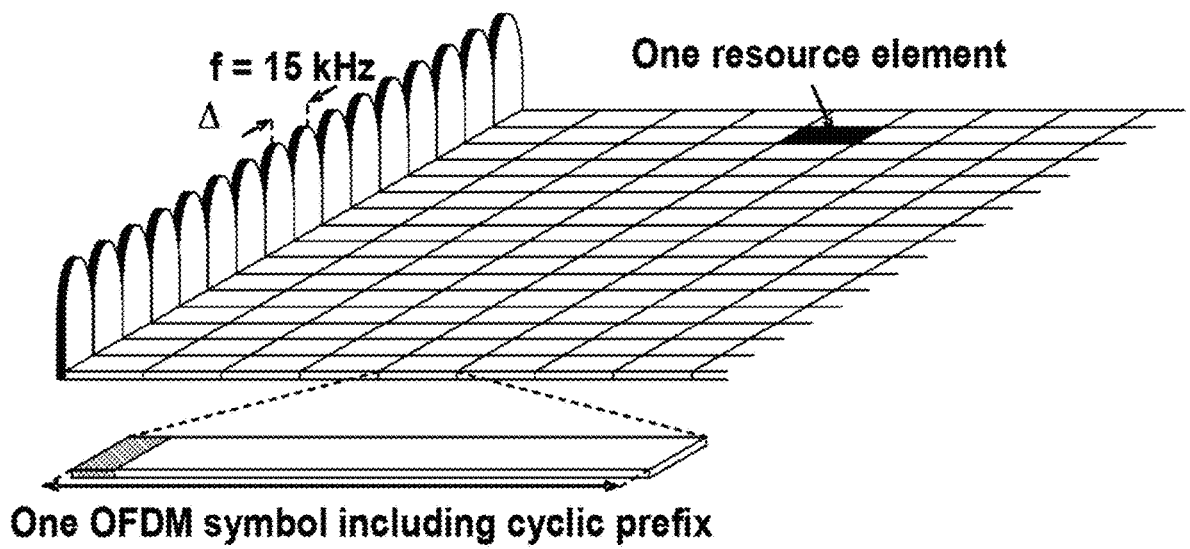
FIG. 1 is a schematic diagram illustrating the basic LTE DL physical resource.
Figure 2:
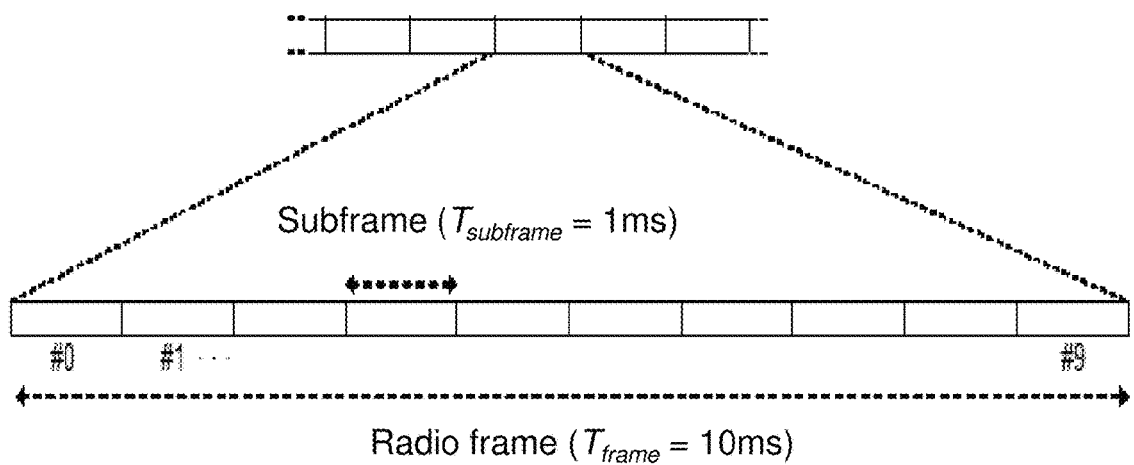
FIG. 2 is a schematic diagram illustrating the LTE time-domain structure.
Figure 3:
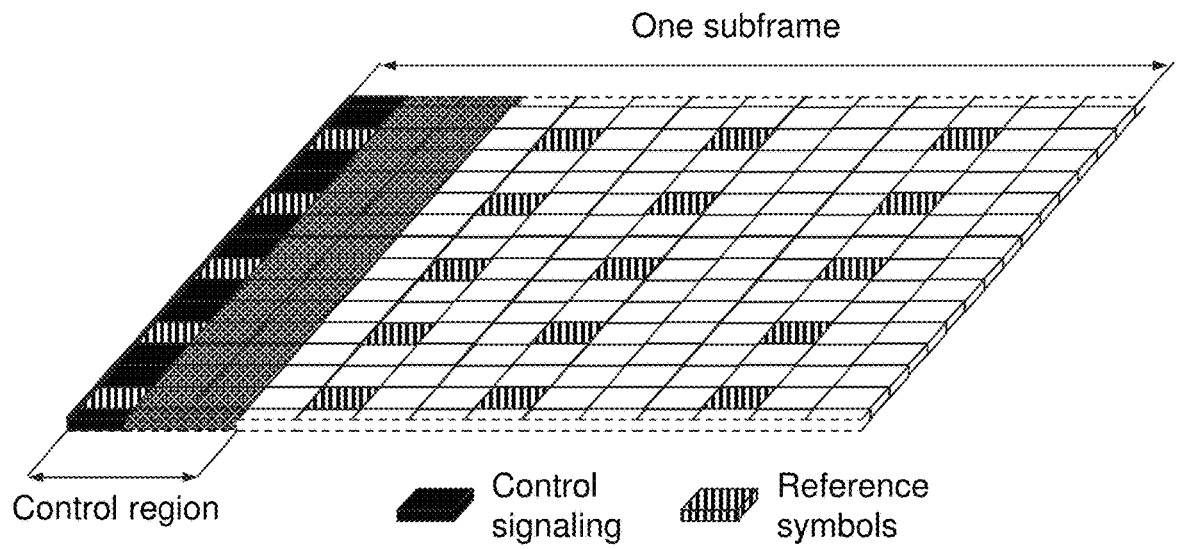
FIG. 3 is a schematic diagram illustrating a normal DL subframe in LTE.
Figure 4:
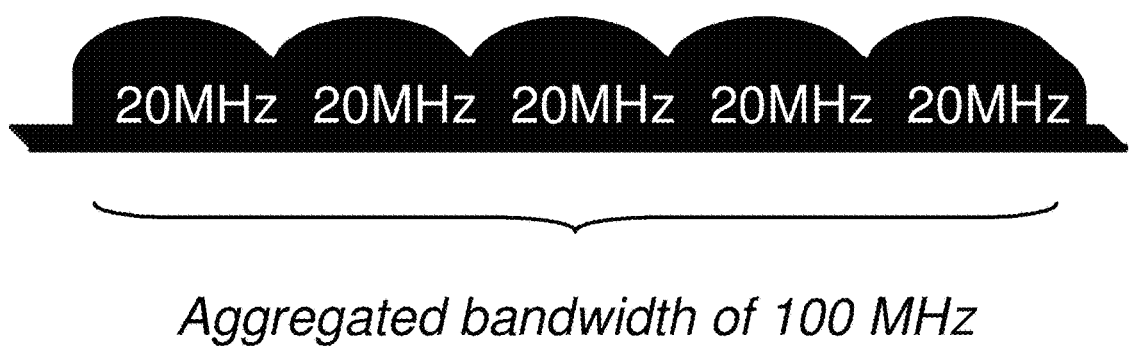
FIG. 4 is a schematic illustrating CA.
Figure 5:
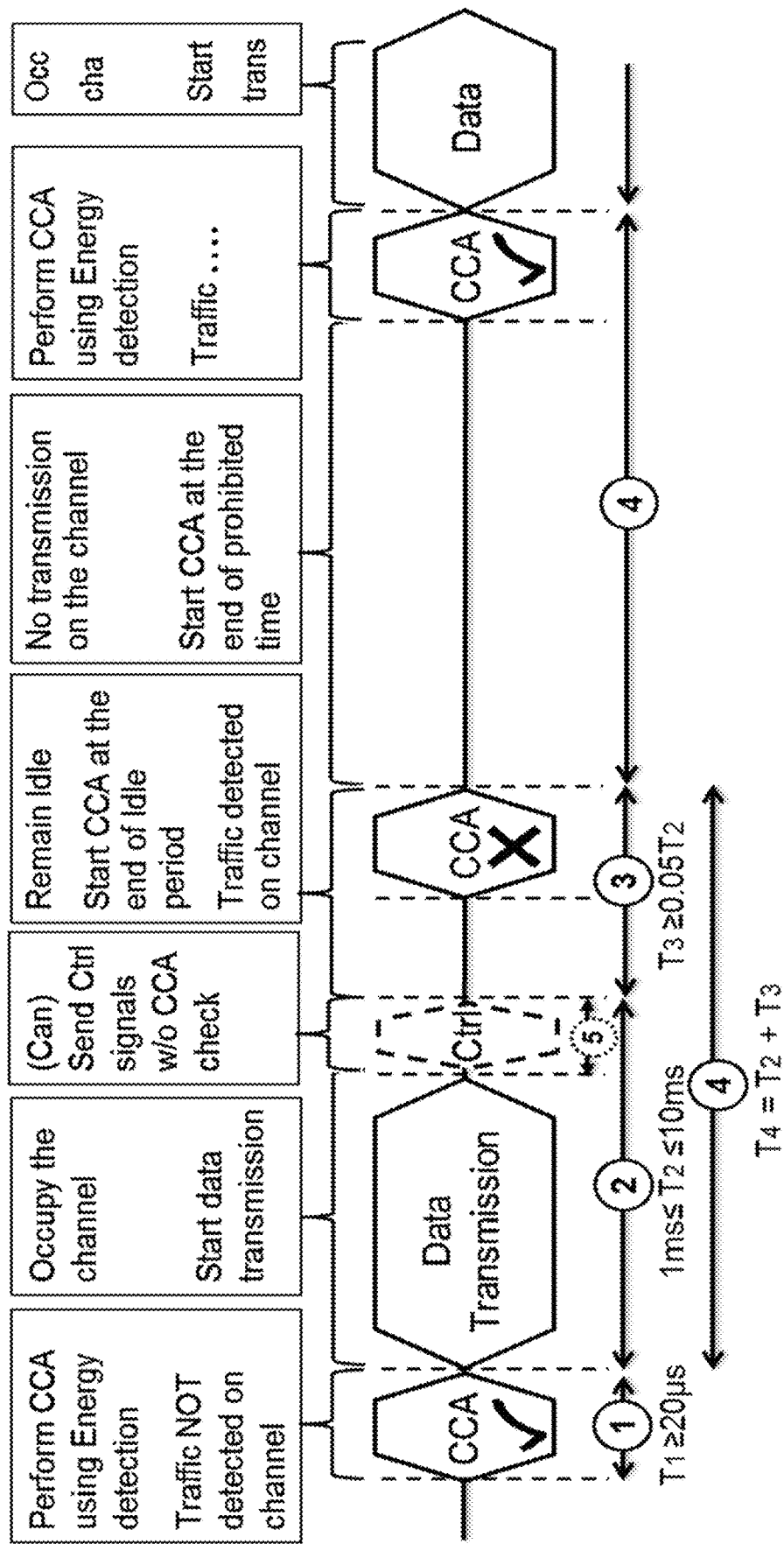
FIG. 5 is a schematic diagram illustrating an example of the LBT mechanism.
Figure 6:
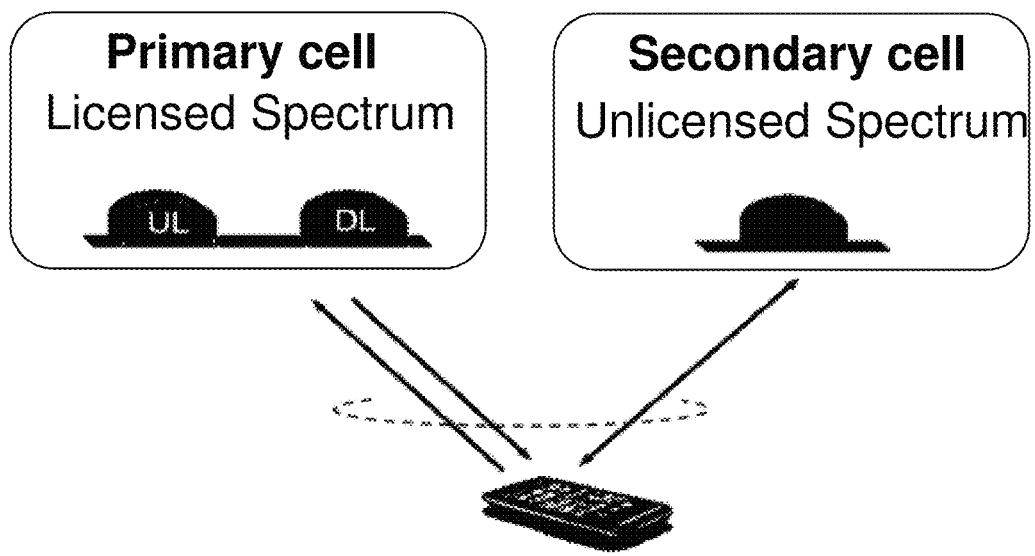
FIG. 6 is a schematic diagram illustrating LAA to unlicensed spectrum using LTE carrier aggregation.

As part of the development of the embodiments disclosed herein, a problem associated with existing methods will first be identified and discussed.

Due to the LBT procedure on the LAA SCell, it may be possible that no SCell DL transmission may occur on a particular subframe if the SCell is unable to occupy the channel. If the SCell does succeed in transmitting, the LBT process may require the puncturing of several OFDM symbols of the subframe in which LBT occurs. As stated earlier, a punctured subframe may be understood as a subframe in which one or more OFDM symbols do not contain control message or data signals for a communication device such as a UE. Such one or more OFDM symbols may carry no transmitted signal or may carry signals not containing control message or data for the communication device. A normal subframe may be understood as a subframe that is not punctured. Subsequent subframes in the SCell transmission burst may not require any puncturing. Thus, UEs that have been scheduled on a particular SCell subframe may not have a priori knowledge of whether the subframe is normal or punctured. Because the two types of subframes may have different Resource Element (RE) mappings of reference signals, control and data channels, it is therefore an improvement to indicate the subframe type to the UEs so they determine the time-frequency location of the information comprised in the subframe correctly.

On the UL, UEs may also perform LBT before transmitting on the LAA SCell. Therefore, the transmitted UL subframe may either be a punctured subframe or a normal subframe. The two types of subframes may have different resource element mappings of reference signals, control and data channels. It is therefore also an improvement to indicate the subframe type to the eNB.

The problem of distinguishing between normal and punctured subframes on the DL is addressed by embodiments herein by including a new subframe-type indication field in, for example, the SCell PDCCH or EPDCCH.

The problem of distinguishing between normal and punctured subframes on the UL is addressed by embodiments herein by including a new subframe-type indication bit in, for example, the Uplink Control Information.

It is further taught by embodiments herein to modify the LTE specifications to accommodate the new subframe-type indication signaling for DL and UL subframes on, for example, the SCell, designed for the purpose described above.

Thus, in particular, a new Subframe-type Indication Signal (SIS) may be defined in embodiments herein for DL and UL subframes on a LBT carrier. An LBT carrier is understood to be a carrier wherein LBT, as described earlier, is used. The SIS may be a Layer 1 (L1) signal designed to indicate whether transmitted subframes on a LAA SCell are punctured or normal. Thus, embodiments herein may concern L1 signaling for a subframe type indication. On the DL, the SIS may be sent using a new DCI field in the (E)PDCCH of the SCell. On the UL, the SIS may be sent using an additional bit in the UE Uplink Control Information (UCI).

Terminologies

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node, e.g., MSC, MME etc. . . . , O&M, OSS, SON, positioning node, e.g., E-SMLC, MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also apply to the multi-point carrier aggregation systems.

Embodiments will now be described more fully hereinafter with reference to the accompanying drawings, in which examples of the claimed subject matter are shown. In this section, the embodiments herein will be illustrated in more detail by a number of exemplary embodiments. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two.

Figure 7:
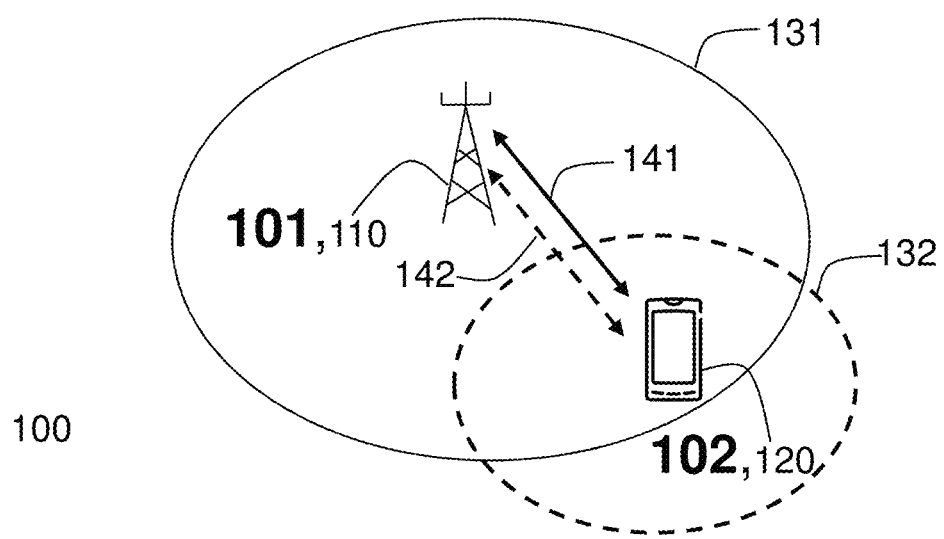
FIG. 7 is a schematic block diagram illustrating embodiments of a wireless communications network, according to embodiments herein.

FIG. 7 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of communication devices, such as the first communication device 101, and the second communication device 102. Any of the first communication device 101 and the second communication device 102 may be a network node such as network node 110 described below, or a wireless device such as wireless device 120 described below. The first communication device 101 may be different than the second communication device 102. Typically, on the DL, the first communication device 101 will be the network node 110 and the second communication device 102 will be the wireless device 120. This corresponds to the non-limiting particular example illustrated in FIG. 7. Also typically, on the UL, the first communication device 101 will be the wireless device 120 and the second communication device 102 will be the network node 110. In Device to Device (D2D) communications, both of the first communication device 101 and the second communication device 102 may be different wireless devices, both in the UL and in the DL.

The wireless communications network 100 comprises a plurality of network nodes whereof the network node 110 is depicted in FIG. 7. The network node 110 may be a transmission point such as a radio base station, for example an eNB, an eNodeB, or an Home Node B, an Home eNode B or any other network node capable to serve a wireless device, such as a user equipment or a machine type communication device in a wireless communications network.

The wireless communications network 100 covers a geographical area which is divided into cell areas, wherein each cell area is served by a network node, although, one network node may serve one or several cells. In the non-limiting example depicted in FIG. 7, the network node 110 serves a first cell 131, which may be a primary cell. The primary cell 131 is typically in licensed spectrum. In FIG. 7, the network node 110 also serves a second cell 132, which may be a licensed-assisted access cell, also referred to herein as licensed-assisted access secondary cell 132, as defined above. The licensed-assisted access cell 132 is in unlicensed spectrum. Since the primary cell 131 and the licensed-assisted access cell 132 are used for communication between the first communication device 101 and the second communication device 102, the primary cell 131 and the licensed-assisted access cell 132 are associated with the first communication device 101 and the second communication device 102. Hence, any of the primary cell 131 and the licensed-assisted access cell 132 may be referred to herein as a cell 131, 132, or the cell 131, 132. The network node 100 may be of different classes, such as, e.g., macro eNodeB, home eNodeB or pico base station, based on transmission power and thereby also cell size. Typically, wireless communications network 100 may comprise more cells similar to the first cell 131 and the second cell 132, served by their respective network node. This is not depicted in FIG. 7 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks.

A wireless device 120 also referred to herein as a user equipment or UE is located in the wireless communication network 100. The wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

The wireless devices 120 is configured to communicate within the wireless communications network 100 with the first network node 110 over a first radio link 141 in the primary cell 131, and over a second radio link 142 in the licensed-assisted access cell 132.

Figure 8:
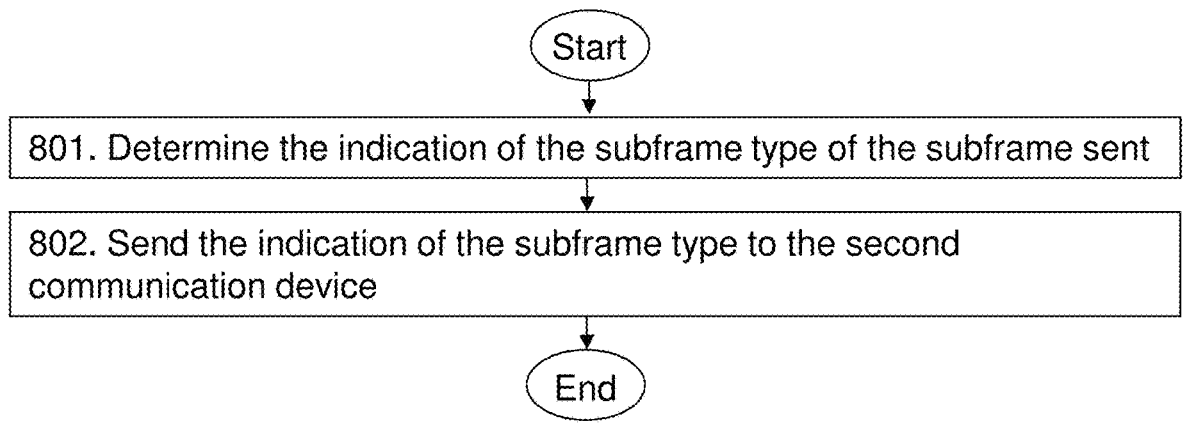
FIG. 8 is a flowchart depicting embodiments of a method in a first communication device, according to embodiments herein.

Embodiments of a method performed by the first communication device 101 for sending an indication to the second communication device 102, will now be described with reference to the flowchart depicted depicted in FIG. 8. The first communication device 101 and the second communication device 102 operate in the wireless communications network 100. FIG. 8 depicts a flowchart of the actions that are performed by the first communication device 101 in embodiments herein.

Action 801

Figure 11:
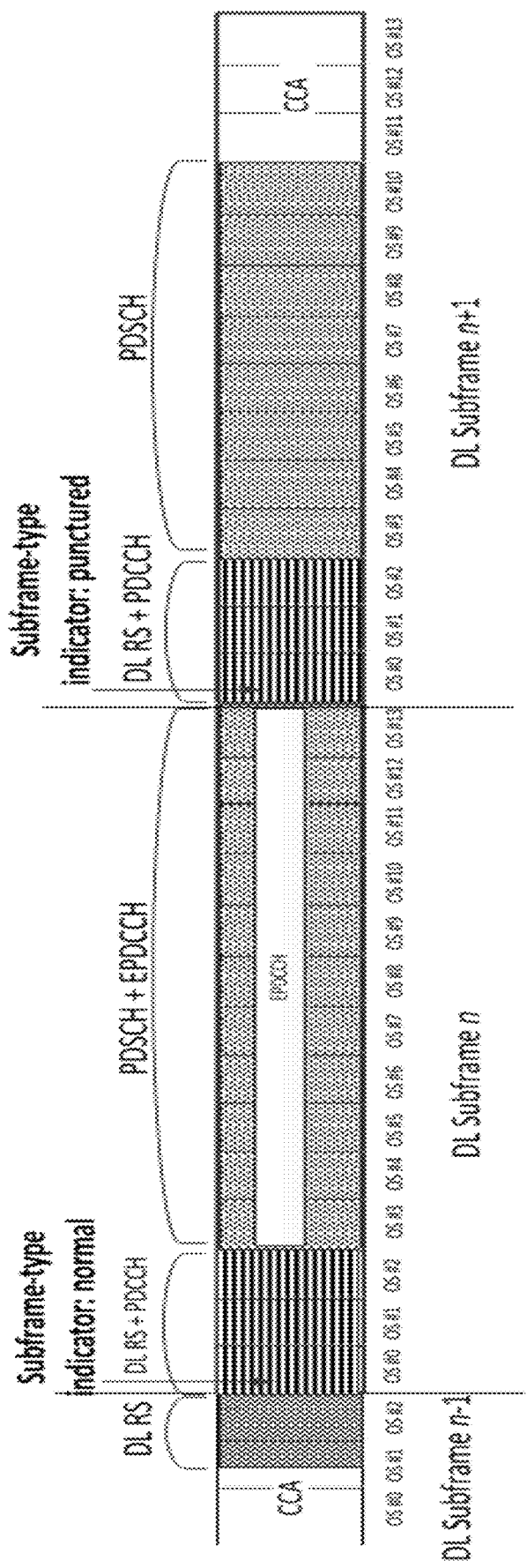
FIG. 11 is a schematic diagram illustrating an example of the SIS in DL, according to embodiments herein.

In certain contexts, such as in LBT, the subframes sent by the first communication device 101 may have different mappings of information, depending on whether the subframe is normal or punctured. The mapping of the information may be understood as the time-frequency location of the information comprised in the subframe, e.g., reference signals, control channels, and data channels, since this location may be different in a punctured subframe compared to a normal subframe. In order to enable the second communication device 102 receiving the subframe to map the information comprised in the subframe correctly, that is, to determine the time-frequency location of the information comprised in the subframe, e.g., reference signals, control channels, and data channels, the first communication device 101 determines an indication of a subframe type. The subframe type is of a subframe sent on a carrier by the cell 132 associated with the first communication device 101 and the second communication device 102. The subframe type is one of punctured and normal. As explained later, the first communication device 101 may determine the indication based on, for example, whether an LBT process is performed or not in the subframe, or where the LBT process is completed in relation to the subframe sent, as explained later. The first communication device 101 may also determine the indication based on whether the subframe needs to be punctured at the end, as shown, for example, in FIG. 11, because of maximum channel occupancy duration regulation. FIG. 11 will be described later.

The subframe type may be associated with a particular mapping of the time-frequency location of the information comprised in the subframe, e.g., as configured by the operator. For example, in some embodiments, a punctured subframe type may indicate a different length, e.g., a different number of OFDM symbols, for the PDSCH, as will be explained in several examples below. For example, a normal subframe may be one corresponding to a PDSCH with a length of 11 OFDM Symbols (OS) in some embodiments, and to a length of 14 OS in others. Whereas a punctured subframe may correspond to a PDSCH of 11 OS length in some embodiments, and to a PDSCH of 8 OS length in others, as described below in the following figures. Moreover, in some embodiments, each of the types normal and punctured may correspond to several subtypes, depending on the length of the PDSCH. That is, the indication may be one of two values in some embodiments, for example, normal and punctured subframe types, whereas the indication may be one of two or more values in other embodiments, for example, normal subframe, punctured subframe type 1, e.g., punctured at the beginning of the subframe as shown later in FIG. 10, and punctured subframe type 2, e.g., punctured at the end of the subframe as shown later in FIG. 11.

The indication of the subframe type presented herein, in some embodiments, may be referred to as a new Subframe-type Indication Signal (SIS). Any reference herein to the SIS should therefore be understood to refer also to the indication of the subframe type.

Figure 9:
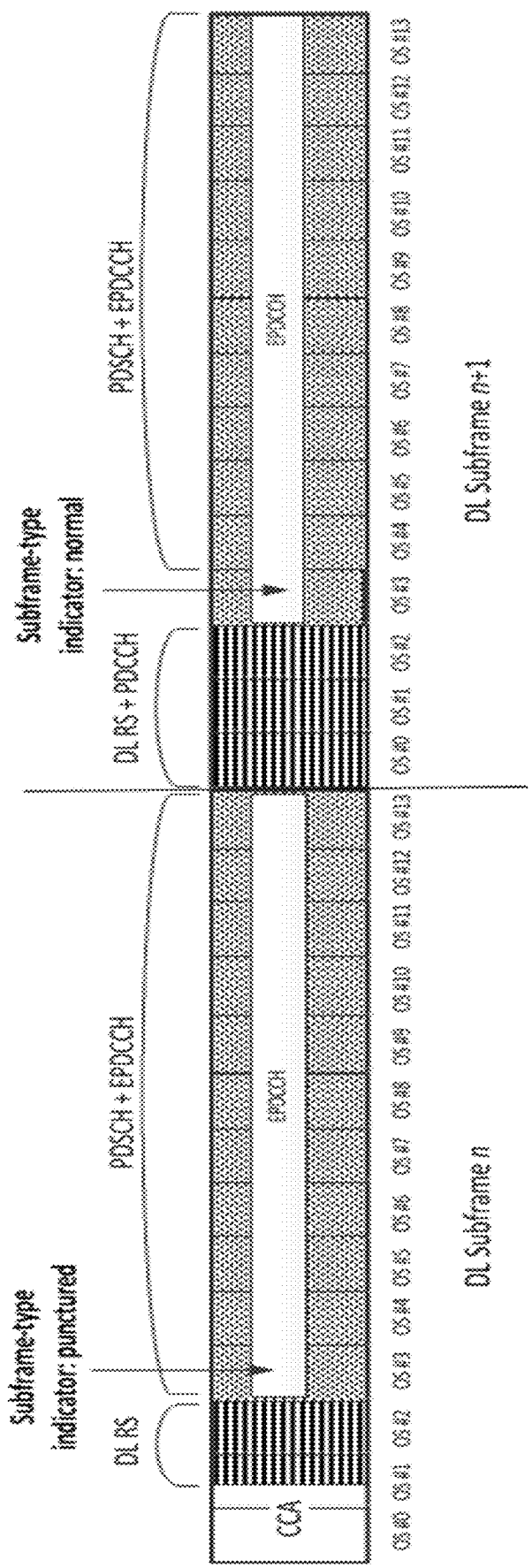
FIG. 9 is a schematic diagram illustrating an example of the Subframe-type Indication Signal (SIS) in DL, according to embodiments herein.

A motivation and application for introducing the SIS may be understood with the following example scenario illustrated in FIG. 9. The scenario in FIG. 9 assumes the first communication device 101, such as an eNB, operates two carriers, with the PCell on a licensed band, and the SCell as a LAA carrier. On some subframe n, a set of second communication devices 120 such as the second communication device 102, e.g., UEs, are scheduled for reception on the SCell which is currently not occupying the channel, i.e., the SCell was silent at least in the period of subframe n−1. Therefore, the SCell may perform LBT to determine if it is allowed to transmit in DL subframe n. In this example, the LBT is performed at the start of subframe n, indicated as CCA. Note that nothing may be transmitted in the legacy PDCCH region of subframe n due to LBT at the start of the subframe. The DL Reference Signals (RS) occupy the part of the subframe marked with horizontal lines. At the start of subframe n, it is unknown to the eNB if it will succeed in occupying the channel, and if so, how long the CCA will take. The LBT succeeds in this example and DL subframe n is punctured, with meaningful data transmitted from the fourth OFDM symbol onwards in the PDSCH and EPDCCH regions, marked with a checkered and white backgrounds, respectively, as indicated. That is, the first communication device 101 in this example determines that indication of the subframe type for subframe n is punctured. The OFDM symbols are represented and numbered in the Figure as OS #, the limits of which are marked with vertical lines. No LBT is performed before sending subframe n+1, which is consequently a normal subframe. That is, the first communication device 101, in this example, then determines that indication of the subframe type for subframe n+1 is normal. The DL RS and the PDCCH occupy the first three OS, marked with horizontal lines. Thus, the RE mapping of reference signals, control and data may vary from subframe to subframe on the LBT carrier. The indication determined in action 801, may enable the second communication device 102 to properly map information comprised in the subframe sent, once the indication is received from the first communication device 101.

Action 802

Once the first communication device has determined the indication, in this action, the first communication device 101 sends the indication to the second communication device 102, the indication being as determined by the first communication device 101.

The indication may then enable the second communication device 102 to properly map information comprised in the subframe sent, according to the received indication. That is, the second communication device 102 may be able, for example to properly locate, decode or read the different signals comprised in the subframe sent, such as reference signals, control channels and data channels. The the second communication device 102 may be, for example, a wireless device such as the wireless device 120 scheduled in the subframe sent. For example, this may occur when the sending 802 is performed in the DL, and the first communication device 101 is a network node 110. In the UL, the first communication device 101 may be the wireless device 120 and the second communication device 102 may be the network node 110.

The SIS may be transmitted on either/both DL and UL subframes on, for example, the LBT carrier, for both Frequency Division Duplex (FDD) and Time Division Duplex (TDD) systems. In some embodiments the carrier is a LBT carrier, and the cell 132 is a LAA cell 132. The SIS may, in some embodiments, be sent in the first subframe on the SCell immediately after successful LBT. Immediately may be understood as after a RS, e.g., a DL RS. A RS may be transmitted immediately after a successful LBT, and the indicator may be transmitted in the EPDCCH, which is after the DL RS.

In some embodiments, the indication is comprised in the subframe sent. In other embodiments, the indication is comprised in the subframe other than the subframe sent.

In some embodiments, the indication is a subframe-type indication signal, which is a L1 layer signal. The cell-specific SIS may, for example, be an L1 signal designed to indicate to second communication devices 120 such as UEs whether DL subframes on a certain LAA SCell are punctured or normal.

In some embodiments, the indication is cell-specific. For example, it may be specific to the LAA cell 132. In some embodiments, the cell 132 is served by the first communication device 101, and the indication is cell-specific.

In some embodiments the cell 132 is served by the first communication device 101, and the indication is User Equipment-specific. That is, the indicated subframe type may be applicable to the targeted UE, and it is not precluded that different UEs may receive different subframe type indications. The cell-specific SIS may be transmitted to UEs via the UE-specific EPDCCH of every subframe by introducing an additional field in relevant DCI formats, as shown in FIG. 9. In other words, for a UE scheduled in the subframe, the DL scheduling message may contain a field to indicate the subframe type of the subframe.

FIG. 9 is a schematic diagram illustrating an example of the SIS in DL subframe EPDCCH after successful LBT at the start of a subframe. While in some embodiments the sending of the indication may be performed in a first subframe on the cell 132 immediately after a successful listen-before-talk process, in some other embodiments, the sending 802 may be performed in the first subframe and one or more subsequent subframes on the cell 132, which may be an LAA cell, immediately after the successful LBT process.

Figure 10:
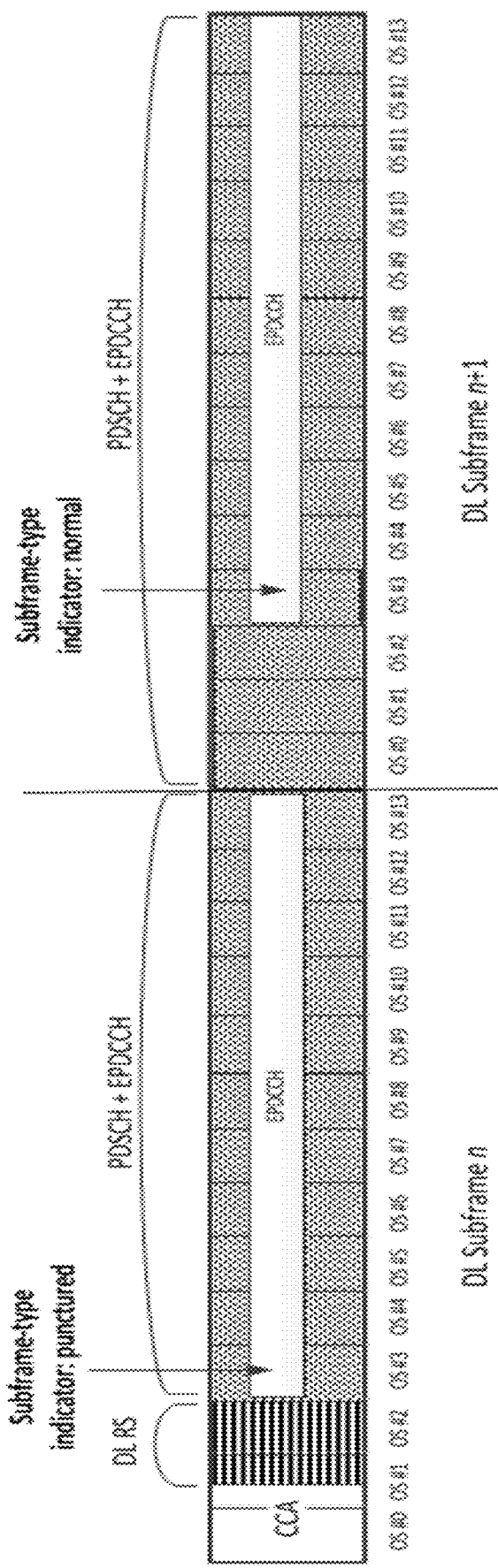
FIG. 10 is a schematic diagram illustrating an example of the SIS in DL, according to embodiments herein.

In another embodiment, the EPDCCH frequency-time resource allocation may be the same regardless of whether it is transmitted in the 1st or subsequent subframes after LBT succeeds. As shown in FIG. 10, DL subframe n+1 may allow data transmissions in all OFDM symbols. The OFDM symbols are represented and numbered in the Figure as OS #, as indicated by the fact that the first three OS in subframe n+1 have a checkered pattern. However, the EPDCCH may still start from OFDM symbol #3 as in the case for DL subframe n. This is because the UE may not know the subframe type before the EPDCCH is successfully decoded. This embodiment may allow lower UE complexity by requiring the UE to search EPDCCH in only one type of EPDCCH frequency-time resource allocation, regardless of the subframe type.

FIG. 10 is a schematic diagram illustrating an example of the SIS in DL subframe EPDCCH with PDSCH in all OFDM symbols.

In yet another embodiment, different EPDCCH frequency-time resource allocations may be used in the first and subsequent subframes after LBT succeeds. This may require UEs to search EPDCCH for both types of EPDCCH frequency-time resource allocations.

In another embodiment illustrated in FIG. 11, LBT may be performed on the last few OFDM symbols of a subframe prior to the subframe boundary. The OFDM symbols are represented and numbered in the Figure as OS #. In this specific example, LBT is successfully performed in the last 3 OFDM symbols of subframe n−1. This is followed by transmission of a normal subframe in subframe n. Assuming that the maximum allowable channel occupancy in the unlicensed spectrum is 2 ms, the last 3 OFDM symbols of subframe n+1 are punctured and LBT is recommenced, as indicated in the figure with CCA. Therefore, the EPDCCH cannot be transmitted in subframe n+1 due to the puncturing. That is, the mapping of the information comprised in the subframe n+1 is different from that comprised in the normal subframe n. The proposed approach may be to transmit the SIS in the PDCCH using an additional field in the relevant DCI formats. The same principle holds for an arbitrary maximum channel occupancy time.

FIG. 11 is a schematic diagram illustrating an example of the SIS in DL subframe PDCCH after successful LBT at the end of a subframe.

Another possibility is that the EPDCCH may always be allocated so that the EPDCCH is not mapped to the first and last OFDM symbols. This may further assume that the EPDCCH may use an applicable DeModulation Reference Signal (DMRS) pattern that only contains DMRS within the allocated EPDCCH area. Such a pattern may for example be to reuse one of the Downlink Pilot Time Slot (DwPTS) DMRS patterns.

To generalize the above, the UE may further be configured within its candidate space with multiple possible DMRS patterns in time, i.e. one or several of the following examples: a) EPDCCH mapping that is from the first OFDM symbol to the last OFDM symbol of the subframe; b) EPDCCH that starts from another OFDM symbol than the first OFDM symbol, and many different starting OFDM symbols are possible; c) EPDCCH that ends at another OFDM symbol than the last OFDM symbol, which may also include a change in DMRS pattern. Many different starting and ending OFDM symbols are possible.

In other words, in some embodiments, the indication is sent in the EPDCCH, and an allocation by the first communication device 101 of frequency-time resource of the EPDCCH comprises one of the following: a) excluding mapping to the first and last symbols of the subframe, b) mapping from a first symbol of the subframe to a last symbol of the subframe, c) starting from another symbol than the first symbol of the subframe, and d) ending at another symbol than the last symbol of the subframe.

The DCI message within the EPDCCH may then contain SIS that indicate which is the starting, ending and applicable DMRS pattern for the PDSCH allocated within the subframe to the UE.

According to the above, in some embodiments, the indication described herein may further comprise information on a pattern of one or more demodulation reference signals comprised in the subframe sent.

Also, according to the above examples, the indication may be sent in an additional field in a DCI format in an EPDCCH, or in a PDCCH.

In some embodiments, an allocation of frequency-time resource of the EPDCCH is the same in the first and subsequent subframes on the cell 132, which may be an LAA cell, immediately after the successful LBT process. In some embodiments, the subframe sent is a DL subframe, and the allocation of EPDCCH frequency-time resource is different in the first and subsequent subframes on the cell 132 immediately after the successful LBT process.

Figure 12:
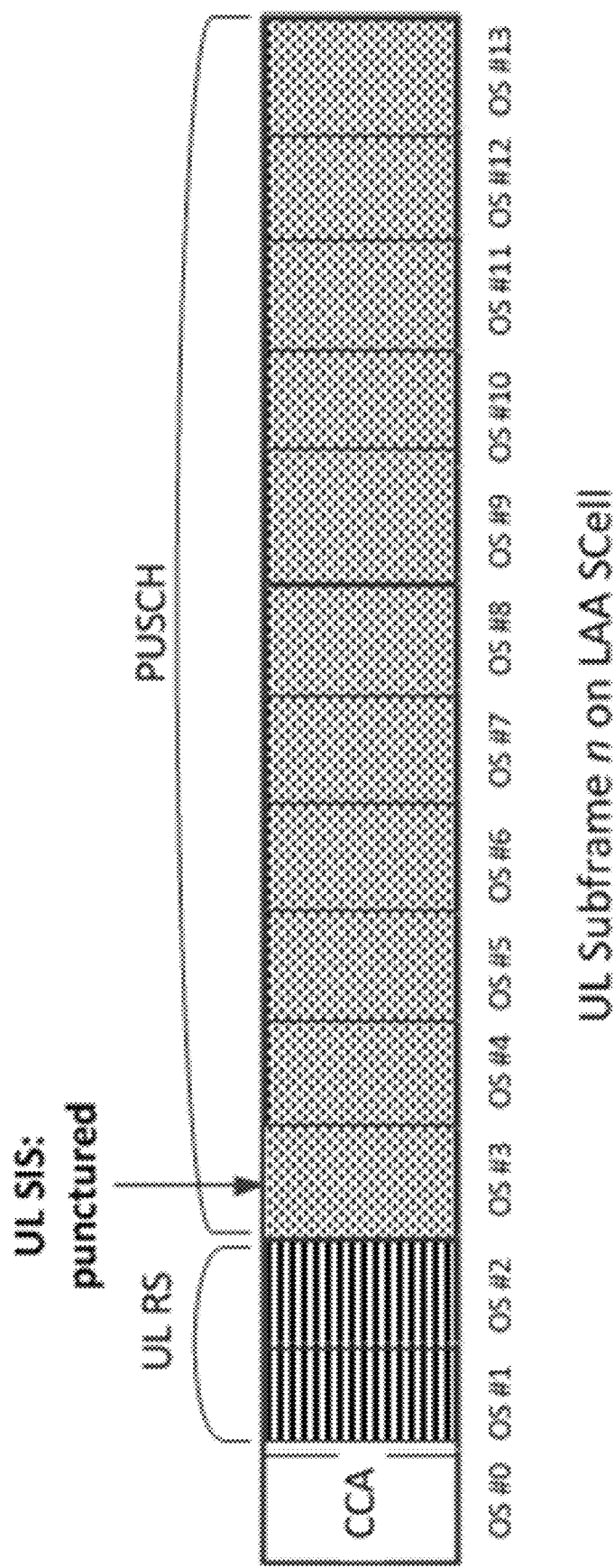
FIG. 12 is a schematic diagram illustrating an example of a punctured UL subframe, according to embodiments herein.

The motivation to use the SIS on the UL is similar to the DL case. The SIS may allow the second communication device 102 such as an eNB to verify if scheduled first communication devices 120 such as UEs transmitted punctured or normal subframes on their UL grants after performing LBT. In some embodiments, the indication is sent in an additional bit in a UCI in the PUCCH. In one embodiment, the SIS may be transmitted along with the UE UCI in the PUSCH region of the first UL subframe successfully transmitted by the UE on the SCell after LBT, as shown in FIG. 12. FIG. 12 is a schematic diagram illustrating an example of a punctured UL subframe after successful LBT by UE. Here, LBT is performed at the start of the subframe, as indicated by CCA, and the first transmitted subframe is punctured up till the third SC-FDMA symbol. The OFDM symbols are represented and numbered in the Figure as OS #.

In other embodiments, the SIS may be transmitted in the UE UCI in the PUCCH. The LBT may also be performed either at the beginning or end of the UL subframe.

The embodiments herein may affect L1 and/or Layer 2 (L2).

An advantage of embodiments herein is that on the DL, the SIS allows the second communication device/s 120 such as UEs to determine the RE mapping of reference signals, control channels, and data channels for that particular DL subframe.

Another advantage of embodiments herein is that on the UL, the SIS allows the second communication device 102 such as the eNB to determine the RE mapping of reference signals, control channels and data channels for that particular UL subframe.

Figure 13:
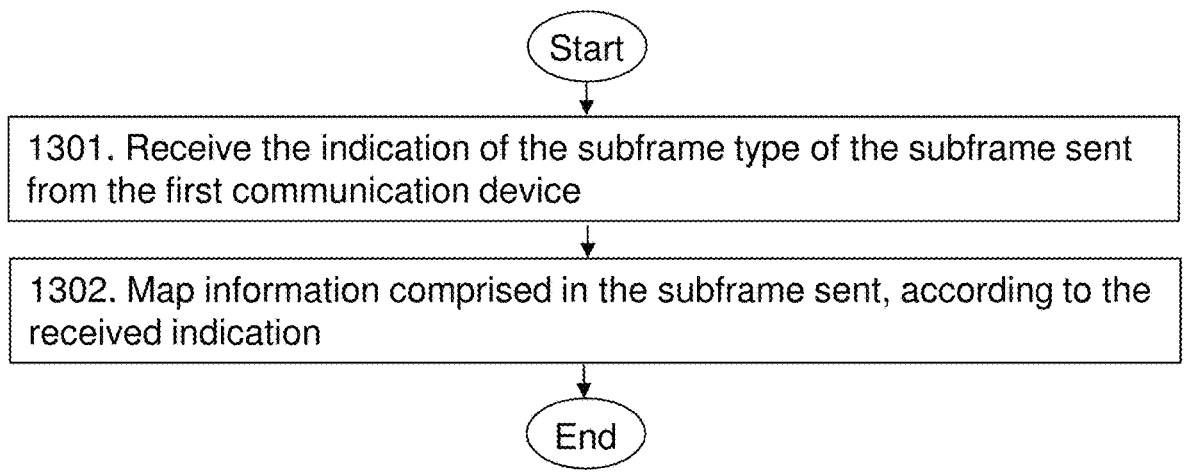
FIG. 13 is a flowchart depicting embodiments of a method in a second communication device, according to embodiments herein.

Embodiments of a method performed by the second communication device 102 for receiving the indication from the first communication device 101, will now be described with reference to the flowchart depicted depicted in FIG. 13. The first communication device 101 and the second communication device 102 operate in the wireless communications network 100. FIG. 13 depicts a flowchart of the action that is performed by the second communication device 102 in embodiments herein.

The detailed description of some of the following corresponds to the same references provided above, in relation to the actions described for the first communication device 101, and will thus not be repeated here.

Action 1301

As part of the communication between the first communication device 101 and the second communication device 102, and in correspondence to action 802 described in relation to FIG. 8, in this action, the second communication device 102 receives from the first communication device 101 the indication of the subframe type, as determined by the first communication device 101 in Action 801. The subframe type is of the subframe received from the first communication device 101 on the carrier by the cell 132 associated with the first communication device 101 and the second communication device 102. The subframe type is one of punctured and normal. As stated earlier, the indication may be comprised in the received subframe. In other embodiments, the indication may be comprised in a subframe other than the received subframe. The indication may be a subframe-type indication signal, which is a L1 layer signal.

In some particular embodiments, the sending 1301 is performed in the first subframe and one or more subsequent subframes on the LAA cell 132 immediately after a successful LBT process.

The cell 132 may be, for example, a LAA cell 132 associated with the first communication device 101 and the second communication device 102.

In some embodiments, the indication is cell-specific.

In some embodiments, the indication is UE-specific.

In some embodiments, the second communication device is a wireless device scheduled in the subframe received.

The indication may be received in an additional field in a Downlink Control Information format in the EPDCCH or in the PDCCH.

In some embodiments wherein the indication is received in the EPDCCH, the allocation of frequency-time resource of the EPDCCH is the same in the received subframe and subsequent subframes, e.g., on the cell 132, which may be an LAA cell. In some embodiments, the allocation of the EPDCCH frequency-time resource is the same in the first and subsequent subframes on the LAA cell 132 immediately after the successful LBT process. In some embodiments, the received subframe is a DL subframe, and the allocation of the EPDCCH frequency-time resource is different in the first and subsequent subframes on the LAA cell 132 immediately after the successful LBT process.

In some embodiments wherein the indication is received in the EPDCCH, the allocation by the second communication device 102 of frequency-time resource of the EPDCCH may comprise one of the following: a) excluding mapping to the first and last symbols of the subframe, b) mapping from a first symbol of the subframe to a last symbol of the subframe, c) starting from another symbol than the first symbol of the subframe, and d) ending at another symbol than the last symbol of the subframe.

In other embodiments, the indication may be received in the additional bit in the UCI in the PUCCH.

The indication may further comprise information on the pattern of one or more demodulation reference signals comprised in the received subframe.

Action 1302

In order to enable the second communication device 102 to map the information comprised in the subframe correctly, in this action, the second communication device 102 maps the information comprised in the subframe received from the first communication device 101, according to the received indication. As stated earlier, according to this action, the second communication device 102 may be able, for example to properly locate, decode or read the different signals comprised in the subframe sent, such as reference signals, control channels and data channels. For instance, the second communication device may not take the received symbols in the first three OFDM symbols as part of a PDSCH if the received indicator indicates a puncture subframe. It should be noted that the control channels that may be mapped by the second communication device 102 in this action are different than the control channel where the indication may have been sent by the first communication device 101.

To perform the method actions described above in relation to FIG. 8, the first communication device 101 is configured to send the indication to the second communication device 102. The first communication device 101 may comprise the following arrangement depicted in FIG. 14. The first communication device 101 and the second communication device 102 are configured to operate in the wireless communications network 100.

The detailed description of some of the following corresponds to the same references provided above, in relation to the actions described for the first communication device 101, and will thus not be repeated here.

The first communication device 101 is further configured to, e.g., by means of a determining module 1400 configured to, determine the indication of the subframe type, the subframe type being of the subframe sent on the carrier by the cell 132 associated with the first communication device 101 and the second communication device 102, wherein the subframe type is one of punctured and normal.

The determining module 1400 may be a processor 1403 of the first communication device 101.

The first communication device 101 is further configured to, e.g., by means of a sending module 1401 configured to, send the indication to the second communication device 102, the indication being as configured to be determined by the first communication device 101.

The sending module 1401 may be a processor 1403 of the first communication device 101.

The cell 132 may be configured to be served by the first communication device 101, and the indication may be cell-specific.

In some embodiments wherein the cell 132 is configured to be served by the first communication device 101, and the indication may be UE-specific.

In some embodiments, the carrier is an LBT carrier and the cell 132 is the LAA cell 132.

The first communication device 101 may be further configured to send in the indication in the first subframe and one or more subsequent subframes on the cell 132, which may be an LAA cell, immediately after the successful LBT process. The first communication device 101 may be also configured to perform this action, e.g. by means of the sending module 1401.

The first communication device 101 may be further configured to send the indication in the first subframe on the cell 132 immediately after a successful LBT process.

In some embodiments, the indication is configured to be sent in an additional field in a DCI format in the EPDCCH, or in the PDCCH.

In other embodiments, the indication is configured to be sent in the additional bit in a UCI in the PUCCH.

In some embodiments, wherein the allocation of frequency-time resource of the EPDCCH is configured to be the same in the first and subsequent subframes on the cell 132, which may be an LAA cell, immediately after the successful LBT process.

In some embodiments wherein the indication is configured to be sent in the EPDCCH, the allocation by the first communication device 101 of frequency-time resource of the EPDCCH may be further configured to one of the following:

a. exclude mapping to the first and last symbols of the subframe, b. map from the first symbol of the subframe to the last symbol of the subframe, c. start from another symbol than the first symbol of the subframe, and d. end at another symbol than the last symbol of the subframe.

The indication may further comprise information on the pattern of one or more demodulation reference signals comprised in the subframe configured to be sent.

Figure 14:
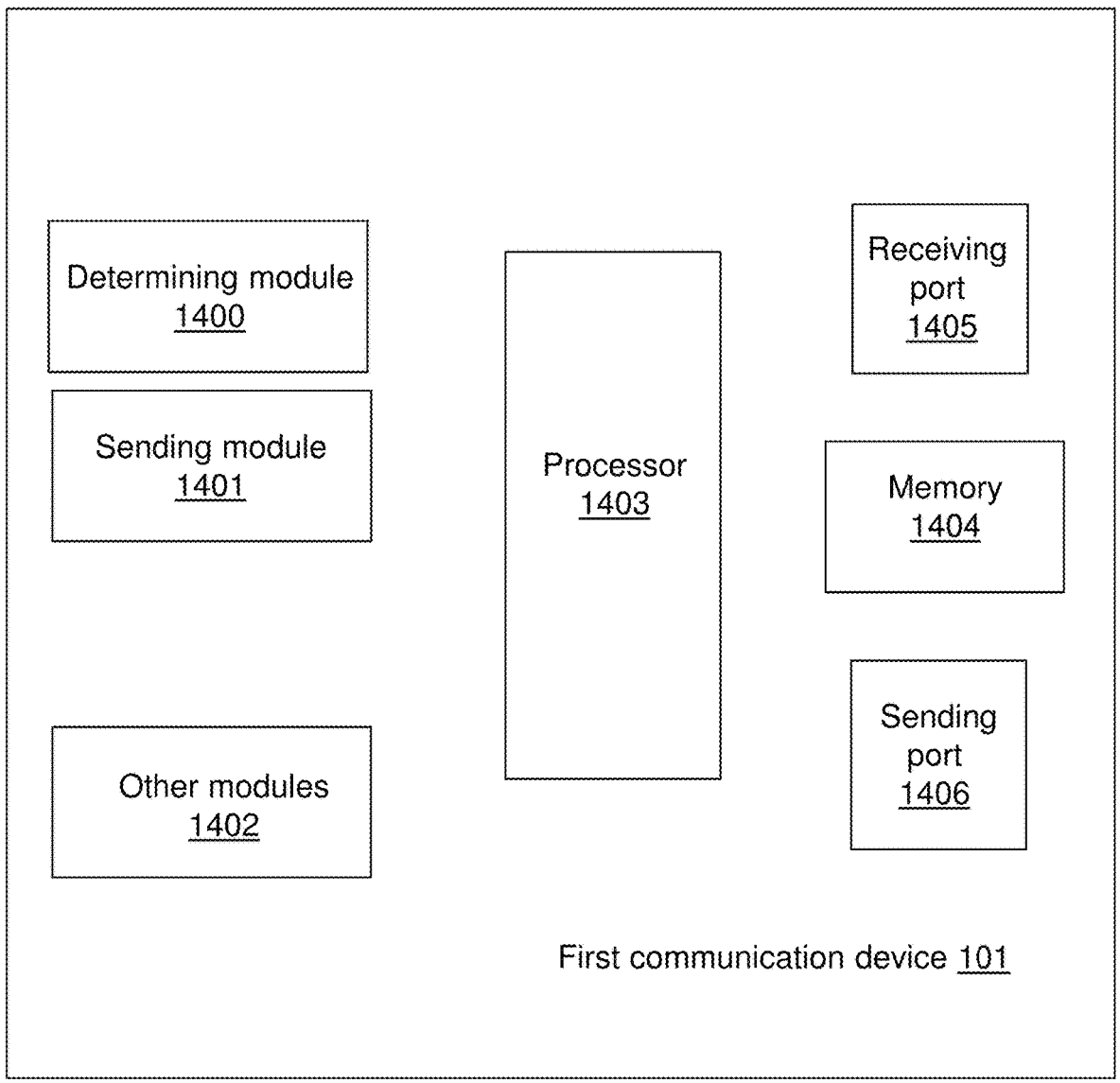
FIG. 14 is a schematic block diagram illustrating embodiments of a first communication device, according to embodiments herein.

The embodiments herein may be implemented through one or more processors, such as a processor 1403 in the first communication device 101 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 1404 comprising one or more memory units. The memory 1404 is arranged to be used to store obtained information, store data, configurations, schedulings, and applications etc. to perform the methods herein when being executed in the first communication device 101.

In some embodiments, the first communication device 101 may receive information from the second communication device 102, through a receiving port 1405. In some embodiments, the receiving port 1405 may be, for example, connected to the two or more antennas in first communication device 101. In other embodiments, the first communication device 101 may receive information from another structure in the wireless communications network 100 through the receiving port 1405. Since the receiving port 1405 may be in communication with the processor 1403, the receiving port 1405 may then send the received information to the processor 1403. The receiving port 1405 may also be configured to receive other information.

The processor 1403 in the first communication device 101 may be further configured to transmit or send information to e.g., the second communication device 102, through a sending port 1406, which may be in communication with the processor 1403, and the memory 1404.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

Those skilled in the art will also appreciate that the determining module 1400, the sending module 1401 and the other modules 1402 described above may refer to a combination of analog and digital modules, and/or one or more processors configured with software and/or firmware, e.g., stored in memory, that, when executed by the one or more processors such as the processor 1403, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1400-1402 described above may be implemented as one or more applications running on one or more processors such as the processor 1403.

Thus, the methods according to the embodiments described herein for the first communication device 101 may be respectively implemented by means of a computer program product, comprising instructions, i.e., software code portions, which, when executed on at least one processor, cause the at least one processor to carry out the action described herein, as performed by the first communication device 101. The computer program product may be stored on a computer-readable storage medium. The computer-readable storage medium, having stored thereon the computer program, may comprise instructions which, when executed on at least one processor, cause the at least one processor to carry out the action described herein, as performed by the first communication device 101. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

According to the foregoing, in some particular embodiments herein, the method performed by the first communication device 101 relates to a method in the first communication device 101 for sending the indication to the second communication device 102, the first communication device 101 and the second communication device 102 operating in the wireless communications system 100, wherein the method comprises the action of: sending 802 to the second communication device 102 the indication of the subframe type, the subframe type being of the subframe sent on the LBT carrier by the LAA cell 132 associated with the first communication device 101 and the second communication device 102, wherein the subframe type is one of punctured and normal, and wherein the sending 201 is performed in the first subframe on the cell 132 immediately after the successful listen-before-talk process, and wherein the indication enables the second communication device 102 to map information comprised in the subframe sent, according to the received indication. That is, the second communication device 102 may be able, for example to properly locate, decode or read the different signals comprised in the subframe sent, such as reference signals, control channels and data channels. The first communication device 101 may be configured to perform this sending 802 action, e.g. by means of the sending module 1401 within the first communication device 101. The sending module 1401 may be the processor 1403 of the first communication device 101, or an application running on such processor.

In some embodiments, the indication is further of a plurality of subframe types, each subframe type of the plurality of subframe types being of a respective subframe sent on the LBT carrier by the LAA cell 132 associated with the first communication device 101 and the second communication device 102, each subframe type is one of punctured and normal, and the indication enables the second communication device 102 to map information comprised in each respective subframe sent, according to the received indication.

To perform the method actions described above in relation to FIG. 13, the second communication device 102 is configured to receive the indication from the first communication device 101. The first communication device 101 may comprise the following arrangement depicted in FIG. 15. As stated earlier, the first communication device 101 and the second communication device 102 are configured to operate in the wireless communications network 100.

The detailed description of some of the following corresponds to the same references provided above, in relation to the actions described for the second communication device 102, and will thus not be repeated here.

The second communication device 102 is further configured to, e.g., by means of a receiving module 1501 configured to, receive from the first communication device 101 the indication of the subframe type, the subframe type being of the subframe configured to be received from the first communication device 101 on the carrier by the cell 132 associated with the first communication device 101 and the second communication device 102. The subframe type is one of punctured and normal.

The receiving module 1501 may be a processor 1504 of the second communication device 102.

The indication may be cell-specific.

In some embodiments, the indication may be UE-specific.

In some embodiments, the cell 132 is the LAA cell 132 associated with the first communication device 101 and the second communication device 102.

The second communication device 102 may be a wireless device configured to be scheduled in the subframe configured to be received.

In some embodiments, the indication is configured to be sent in an additional field in a DCI format in the EPDCCH, or in the PDCCH.

In other embodiments, the indication is configured to be received in the additional bit in a UCI in the PUCCH.

In some embodiments, the indication is configured to be received in an EPDCCH, and an allocation by the second communication device 102 of frequency-time resource of the EPDCCH is configured to be the same in the subframe configured to be received and subsequent subframes on the cell 132, which may be an LAA cell.

In some embodiments wherein the indication is configured to be received in the EPDCCH, the allocation by the second communication device 102 of frequency-time resource of the EPDCCH may be further configured to one of the following: a) exclude mapping to the first and last symbols of the subframe, b) map from the first symbol of the subframe to the last symbol of the subframe, c) start from another symbol than the first symbol of the subframe, and d) end at another symbol than the last symbol of the subframe.

The indication may further comprise information on the pattern of one or more demodulation reference signals comprised in the subframe configured to be received.

The second communication device 102 is further configured to, e.g., by means of a mapping module 1502 configured to, map information comprised in the subframe configured to be received from the first communication device 101, according to the received indication.

The mapping module 1502 may be the processor 1504 of the second communication device 102.

The second communication device 102 may comprise other modules 1503.

Figure 15:
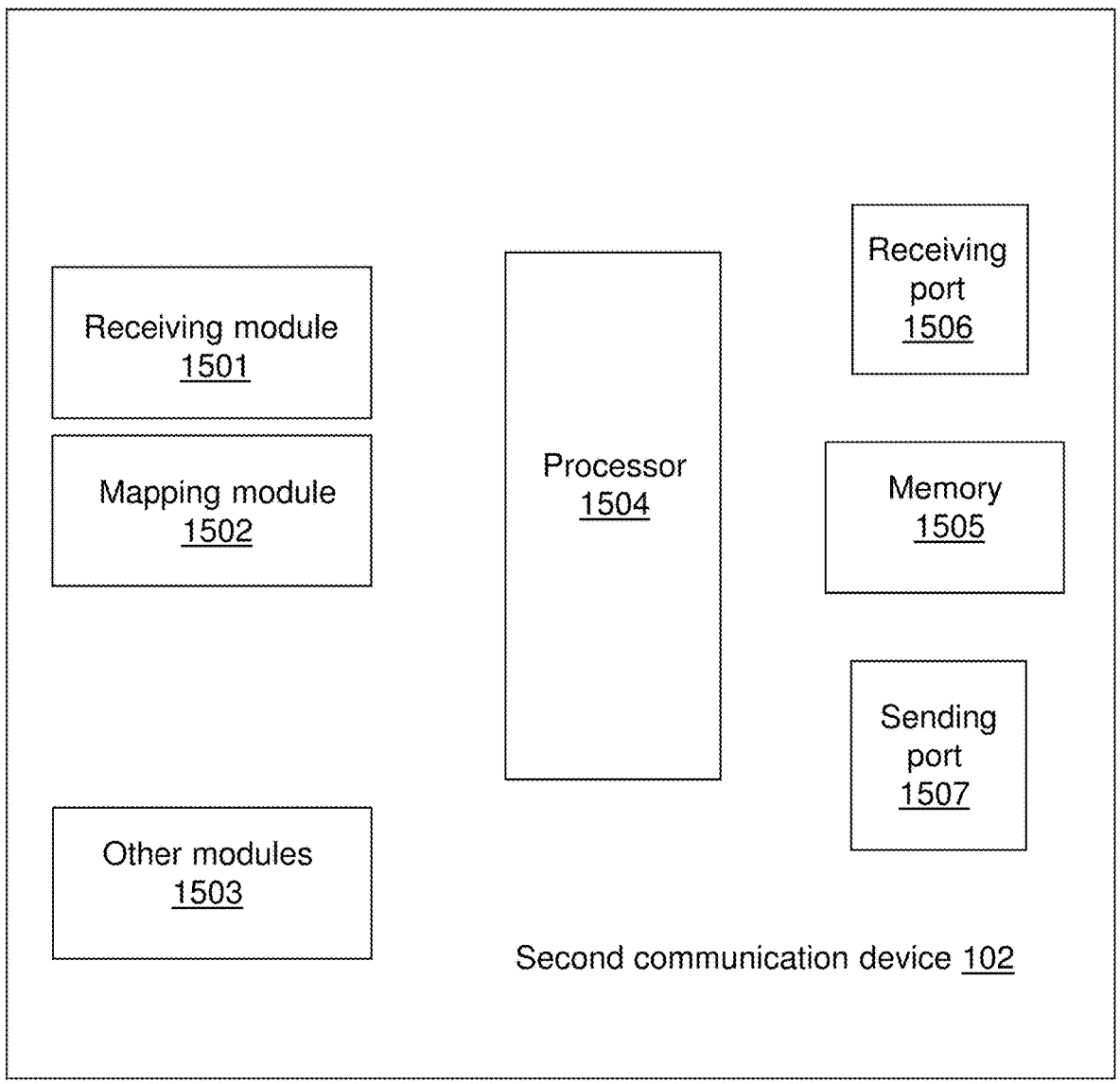
FIG. 15 is a schematic block diagram illustrating embodiments of a second communication device, according to embodiments herein.

The embodiments herein may be implemented through one or more processors, such as the processor 1504 in the second communication device 102 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102.

The second communication device 102 may further comprise a memory 1505 comprising one or more memory units. The memory 1505 is arranged to be used to store obtained information, store data, configurations, schedulings, and applications etc. to perform the methods herein when being executed in the second communication device 102.

In some embodiments, the second communication device 102 may receive information from the first communication device 101, through a receiving port 1506. In some embodiments, the receiving port 1506 may be, for example, connected to the two or more antennas in first communication device 101. In other embodiments, the second communication device 102 may receive information from another structure in the wireless communications network 100 through the receiving port 1506. Since the receiving port 1506 may be in communication with the processor 1504, the receiving port 1506 may then send the received information to the processor 1504. The receiving port 1506 may also be configured to receive other information.

The processor 1504 in the second communication device 102 may be further configured to transmit or send information to e.g., the first communication device 101, through a sending port 1507, which may be in communication with the processor 1504, and the memory 1505.

The second communication device 102 may comprise an interface unit to facilitate communications between the second communication device 102 and other nodes or devices, e.g., the first communication device 101. The interface may, for example, include a transceiver configured to transmit and receive radio signals over an air interface in accordance with a suitable standard.

Those skilled in the art will also appreciate that the receiving module 1501, the mapping module 1502 and the other modules 1503 described above may refer to a combination of analog and digital modules, and/or one or more processors configured with software and/or firmware, e.g., stored in memory, that, when executed by the one or more processors such as the processor 1504, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1501-1503 described above may be implemented as one or more applications running on one or more processors such as the processor 1504.

Thus, the methods according to the embodiments described herein for the second communication device 102 may be respectively implemented by means of a computer program product, comprising instructions, i.e., software code portions, which, when executed on at least one processor, cause the at least one processor to carry out the action described herein, as performed by the second communication device 102. The computer program product may be stored on a computer-readable storage medium. The computer-readable storage medium, having stored thereon the computer program, may comprise instructions which, when executed on at least one processor, cause the at least one processor to carry out the action described herein, as performed by the second communication device 102. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

Also, in some embodiments, the different modules 1501-1503 described above may be implemented as one or more applications running on one or more processors such as the processor 1504.

According to the foregoing, in some particular embodiments herein, the method performed by the second communication device 102 relates to a method in the second communication device 102 for receiving the indication from the first communication device 101, the first communication device 101 and the second communication device 102 operating in a wireless communications system 100. The method may comprise the action of: receiving 1301 from the first communication device 101 the indication of the subframe type, the subframe type being of a subframe sent on a listen-before-talk carrier by a licensed-assisted access cell 132 associated with the first communication device 101 and the second communication device 102, wherein the subframe type is one of punctured and normal, and wherein sending of the subframe sent is performed in a first subframe on the licensed-assisted access cell 132 immediately after the successful LBT process, and wherein the indication enables the second communication device 102 to map information comprised in the subframe sent, according to the received indication. The second communication device 102 may be configured to perform this action, e.g. by means of a receiving module 1501 within the second communication device 102. The receiving module 1501 may be a processor 1504 of the second communication device 102, or an application running on such processor.

The method may also comprise the action of: mapping 1302 the information comprised in the subframe sent, according to the received indication. The second communication device 102 is configured to perform this action, e.g. by means of a mapping module 1502 within the second communication device 102. The mapping module 1502 may be a processor 1504 of the second communication device 102, or an application running on such processor.

In some embodiments, the indication is further of a plurality of subframe types, each subframe type of the plurality of subframe types being of a respective subframe sent on a LBT carrier by an LAA cell 132 associated with the first communication device 101 and the second communication device 102, wherein each subframe type is one of punctured and normal, and wherein the indication enables the second communication device 102 to map information comprised in each respective subframe sent, according to the received indication.

As previously described, there is provided methods and devices and computer-readable mediums, which are repeated below.

A method performed by a first communication device for sending an indication to a second communication device, the first communication device and the second communication device 102 operating in a wireless communications system, the method comprising: sending to the second communication device an indication of a subframe type, the subframe type being of a subframe sent on a listen-before-talk carrier by a licensed-assisted access cell associated with the first communication device and the second communication device, wherein the subframe type is one of punctured and normal, and wherein the sending is performed in a first subframe on the licensed-assisted access cell immediately after a successful listen-before-talk process, and wherein the indication enables the second communication device to map information comprised in the subframe sent, according to the received indication.

In some embodiments, the indication is subframe-type indication signal, which is a L1 layer signal.

In some embodiments, the indication is cell-specific.

In some embodiments, the subframe sent is sent in DL, and the subframe is sent in an additional field in a DCI format in an EPDCCH.

In some embodiments, the subframe sent is sent in DL, and the subframe is sent in a PDCCH.

In some embodiments, the second communication device is a wireless device scheduled in the subframe sent.

In some embodiments, an allocation of EPDCCH frequency-time resource is the same in the first and subsequent subframes on the licensed-assisted access cell 132 immediately after the successful listen-before-talk process.

In some embodiments, the subframe sent is a DL subframe, and an allocation of EPDCCH frequency-time resource is different in the first and subsequent subframes on the licensed-assisted access cell 132 immediately after the successful listen-before-talk process.

In some embodiments, the subframe sent is sent in DL, and an allocation of EPDCCH frequency-time resource comprises one of the following:

excludes mapping to the first and last symbols of the subframe, maps from a first symbol of the subframe to a last symbol of the subframe, starts from another symbol than the first symbol of the subframe, and ends at another symbol than the last symbol of the subframe.

In some embodiments, the indication further comprises information on a pattern of one or more demodulation reference signals comprised in the subframe sent.

In some embodiments, the subframe sent is sent in UL, and the subframe is sent in an additional bit in an UCI in a PUCCH.

In some embodiments, the sending is performed in a first subframe and one or more subsequent subframes on the licensed-assisted access cell immediately after a successful listen-before-talk process.

In some embodiments, the indication is comprised in the subframe sent.

In some embodiments, the indication is comprised in a subframe other than the subframe sent.

In some embodiments, the indication is further of a plurality of subframe types, each subframe type of the plurality of subframe types being of a respective subframe sent on a LBT carrier by a LAA cell associated with the first communication device 101 and the second communication device, wherein each subframe type is one of punctured and normal, and wherein the indication enables the second communication device to map information comprised in each respective subframe sent, according to the received indication.

A first communication device 101 configured to perform any of the methods of embodiments just described.

Computer program, comprising instructions which, when executed on at least one processor, cause the at least one processor to carry out the method according to any one of the embodiments just described for the first communication device.

A computer-readable storage medium, having stored thereon a computer program, comprising instructions which, when executed on at least one processor, cause the at least one processor to carry out the method according to any one of the embodiments just described for the first communication device.

A method performed by a second communication device for receiving an indication from a first communication device, the first communication device and the second communication device operating in a wireless communications system, the method comprising: receiving from the first communication device an indication of a subframe type, the subframe type being of a subframe sent on a listen-before-talk carrier by a licensed-assisted access cell associated with the first communication device and the second communication device, wherein the subframe type is one of punctured and normal, and wherein sending of the subframe sent is performed in a first subframe on the licensed-assisted access cell immediately after a successful listen-before-talk process, and wherein the indication enables the second communication device 102 to map information comprised in the subframe sent, according to the received indication.

In some embodiments, the indication is subframe-type indication signal, which is a L1 layer signal.

In some embodiments, the indication is cell-specific.

In some embodiments, the subframe sent is sent in DL, and wherein the subframe is sent in an additional field in a DCI format in an EPDCCH.

In some embodiments, the subframe sent is sent in DL, and the subframe is sent in a PDCCH.

In some embodiments, the second communication device is a wireless device scheduled in the subframe sent.

In some embodiments, an allocation of EPDCCH frequency-time resource is the same in the first and subsequent subframes on the licensed-assisted access cell 132 immediately after the successful LBT process.

In some embodiments, the subframe sent is a DL subframe, and an allocation of EPDCCH frequency-time resource is different in the first and subsequent subframes on the LAA cell 132 immediately after the successful LBT process.

In some embodiments, the subframe sent is sent in DL, and an allocation of EPDCCH frequency-time resource comprises one of the following:

excludes mapping to the first and last symbols of the subframe, maps from a first symbol of the subframe to a last symbol of the subframe, starts from another symbol than the first symbol of the subframe, and ends at another symbol than the last symbol of the subframe.

In some embodiments, the indication further comprises information on a pattern of one or more demodulation reference signals comprised in the subframe sent.

In some embodiments, the subframe sent is sent in UL, and the subframe is sent in an additional bit in an UCI in a PUCCH.

In some embodiments, the sending of the indication is performed in a first subframe and one or more subsequent subframes on the LAA cell immediately after a successful listen-before-talk process.

In some embodiments, the indication is comprised in the subframe sent.

In some embodiments, the indication is comprised in a subframe other than the subframe sent.

In some embodiments, the indication is further of a plurality of subframe types, each subframe type of the plurality of subframe types being of a respective subframe sent on a LBT carrier by a LAA cell associated with the first communication device and the second communication device, wherein each subframe type is one of punctured and normal, and wherein the indication enables the second communication device to map information comprised in each respective subframe sent, according to the received indication.

A second communication device configured to perform any of the methods of embodiments just described.

Computer program, comprising instructions which, when executed on at least one processor, cause the at least one processor to carry out the method according to any one of the embodiments just described for the second communication device.

A computer-readable storage medium, having stored thereon a computer program, comprising instructions which, when executed on at least one processor, cause the at least one processor to carry out the method according to any one of the embodiments just described for the second communication device.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first communication device for sending an indication to a second communication device, the method comprising:
    determining an indication of a subframe type, the subframe type being of a subframe sent on a carrier by a cell associated with the first communication device and the second communication device, the subframe type being one of punctured and normal and the cell being a licensed-assisted cell, a normal subframe type being one in which all orthogonal frequency division multiplexed (OFDM) symbols of the subframe are occupied, and a punctured subframe being one in which less than all OFDM symbols of the subframe are occupied; and
    sending the indication to the second communication device over an unlicensed carrier downlink control information (DCI) that includes an indication of a subframe type in a first subframe on the licensed-assisted cell immediately after a successful listen-before-talk process, the indication including an indication of occupied OFDM symbols.

2. A method performed by a second communication device for receiving an indication from a first communication device, the method comprising:
    receiving from the first communication device over an unlicensed carrier, downlink control information (DCI) that includes an indication of a subframe type in a first subframe on a licensed-assisted cell immediately after a successful listen-before-talk process, the indication of the subframe type including an indication of occupied orthogonal frequency division multiplexed (OFDM) symbols, the subframe type being of a subframe received from the first communication device, the subframe type being one of punctured and normal and the cell being a licensed-assisted access cell, a normal subframe type being one in which all OFDM symbols of the subframe are occupied, and a punctured subframe being one in which less than all OFDM symbols of the subframe are occupied; and
    mapping information comprised in the subframe received from the first communication device, according to the received indication, the information corresponding to at least one physical channel, the mapping being based on occupied OFDM symbols indicated by the first communication device.

3. A first communication device configured to send an indication to a second communication device, the first communication device being further configured to:
    determine an indication of a subframe type, the subframe type being of a subframe sent on a carrier by a cell associated with the first communication device and a second communication device, the subframe type being one of punctured and normal and the cell being a license-assisted access cell, a normal subframe type being one in which all orthogonal frequency division multiplexed (OFDM) symbols of the subframe are occupied, and a punctured subframe being one in which less than all OFDM symbols of the subframe are occupied; and
    send the indication to the second communication device over an unlicensed carrier downlink control information (DCI) that includes an indication of a subframe type in a first subframe on the licensed-assisted cell immediately after a successful listen-before-talk process, the indication including an indication of occupied OFDM symbols.

4. The first communication device of claim 3, wherein at least one of:
    the cell is configured to be served by the first communication device, and the indication is one of cell-specific and User Equipment specific; and
    the indication further comprises information on a pattern of one or more demodulation reference signals comprised in the subframe configured to be sent.

5. The first communication device of claim 4, wherein the carrier is a listen-before-talk carrier.

6. The first communication device of claim 3, wherein the carrier is a listen-before-talk carrier.

7. The first communication device of claim 3, wherein the indication is configured to be sent in an additional field in a Downlink Control Information format in an Enhanced Physical Downlink Control Channel, EPDCCH, or in a Physical Downlink Control Channel, PDCCH.

8. The first communication device of claim 3, wherein the indication is configured to be sent in an additional field in a Downlink Control Information format in one of an Enhanced Physical Downlink Control Channel, EPDCCH, and in a Physical Downlink Control Channel, PDCCH.

9. The first communication device of claim 3 wherein an allocation of frequency-time resource of an Enhanced Physical Downlink Control Channel, EPDCCH, is configured to be the same in a first and subsequent subframes on the cell immediately after a successful listen-before-talk process.

10. The first communication device of claim 3, wherein the indication is configured to be sent in an EPDCCH, and wherein an allocation by the first communication device of frequency-time resource of the EPDCCH is further configured to one of the following:
    a. exclude mapping to the first and last symbols of the subframe, b. map from a first symbol of the subframe to a last symbol of the subframe, c. start from another symbol than the first symbol of the subframe, and d. end at another symbol than the last symbol of the subframe.

11. The first communication device of claim 3, wherein the indication is configured to be sent in an additional bit in an Uplink Control Information in a Physical Uplink Control Channel, PUCCH.

12. A second communication device configured to receive an indication from a first communication device, the second communication device being further configured to:

receive from the first communication device over an unlicensed carrier, downlink control information (DCI) that includes an indication of a subframe type in a first subframe on a licensed-assisted cell immediately after a successful listen-before-talk process, the indication of subframe type including an indication of occupied orthogonal frequency division multiplexed (OFDM) symbols, the subframe type being of a subframe configured to be received from the first communication device on a carrier by a cell associated with the first communication device and the second communication device, the subframe type being one of punctured and normal and the cell being a licensed-assisted access cell, a normal subframe type being one in which all OFDM symbols of the subframe are occupied, and a punctured subframe being one in which less than all OFDM symbols of the subframe are occupied; and map information comprised in the subframe configured to be received from the first communication device, according to the received indication, the information corresponding to at least one physical channel, the mapping being based on occupied OFDM symbols indicated by the first communication device.

13. The second communication device of claim 12, wherein at least one of:

the indication is one of cell-specific and User Equipment-specific; and the indication further comprises information on a pattern of one or more demodulation reference signals comprised in the subframe configured to be received.

14. The second communication device of claim 13, wherein the indication is configured to be received in an additional field in a Downlink Control Information format in an Enhanced Physical Downlink Control Channel, EPDCCH or in a Physical Downlink Control Channel, PDCCH.

15. The second communication device of claim 12, wherein the indication is configured to be received in an additional field in a Downlink Control Information format in one of an Enhanced Physical Downlink Control Channel, EPDCCH and in a Physical Downlink Control Channel, PDCCH.

16. The second communication device of claim 12, wherein the second communication device is a wireless device configured to be scheduled in the subframe configured to be received.

17. The second communication device of claim 12, wherein the indication is configured to be received in an EPDCCH, and wherein an allocation of frequency-time resource of the EPDCCH is configured to be the same in the subframe configured to be received and subsequent subframes on the cell.

18. The second communication device of claim 12, wherein the indication is configured to be received in an EPDCCH, and wherein an allocation by the second communication device of frequency-time resource of the EPDCCH is further configured to one of the following:

a. exclude mapping to the first and last symbols of the subframe, b. map from a first symbol of the subframe to a last symbol of the subframe, c. starts from another symbol than the first symbol of the subframe, and d. ends at another symbol than the last symbol of the subframe.

19. The second communication device of claim 12, wherein the indication is configured to be received in an additional bit in an Uplink Control Information in a Physical Uplink Control Channel, PUCCH.

* * * * *

UNITED STATES PATENT AND TRADEMARK OFFICE
CERTIFICATE OF CORRECTION

PATENT NO. : 10,925,053 B2
APPLICATION NO. : 14/778919
DATED : February 16, 2021
INVENTOR(S) : Mukherjee et al.

Page 1 of 1

It is certified that error appears in the above-identified patent and that said Letters Patent is hereby corrected as shown below:

In the Specification

In Column 3, Line 25, delete "Cell-specific Reference Symbols (CRS)" and insert -- Cell-specific Reference Signals (CRS) --, therefor.

In Column 5, Line 51, delete "an represent" and insert -- and represent --, therefor.

In Column 9, Line 18, delete "laptop embedded equipped (LEE)," and insert -- laptop embedded equipment (LEE), --, therefor.

In Column 12, Lines 20-21, delete "second communication devices 120" and insert -- second communication devices 102 --, therefor.

In Column 13, Line 26, delete "second communication devices 120" and insert -- second communication devices 102 --, therefor.

In Column 15, Lines 14-15, delete "first communication devices 120" and insert -- first communication devices 101 --, therefor.

In Column 15, Line 35, delete "second communication device/s 120" and insert -- second communication device/s 102 --, therefor.

In Column 18, Line 13, delete "loaded into the in the first" and insert -- loaded into the first --, therefor.

In Column 20, Line 66, delete "loaded into the in the" and insert -- loaded into the --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*